March 3, 1931. F. C. FREEMAN 1,795,019
METER PIPE SUPPORTING CLAMP
Filed June 12, 1929
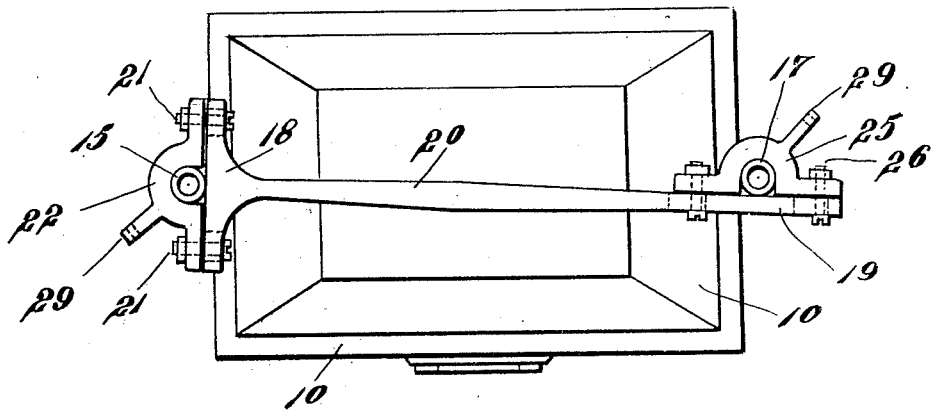
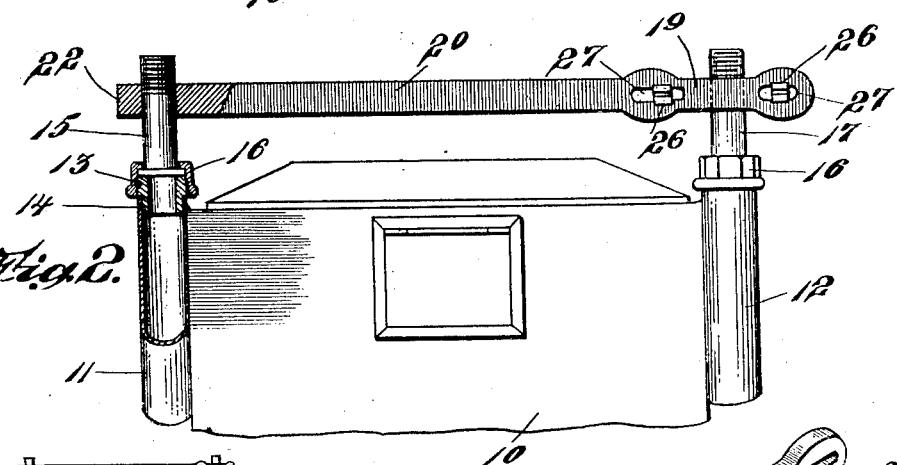
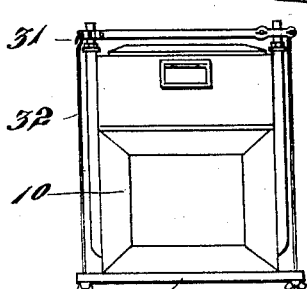
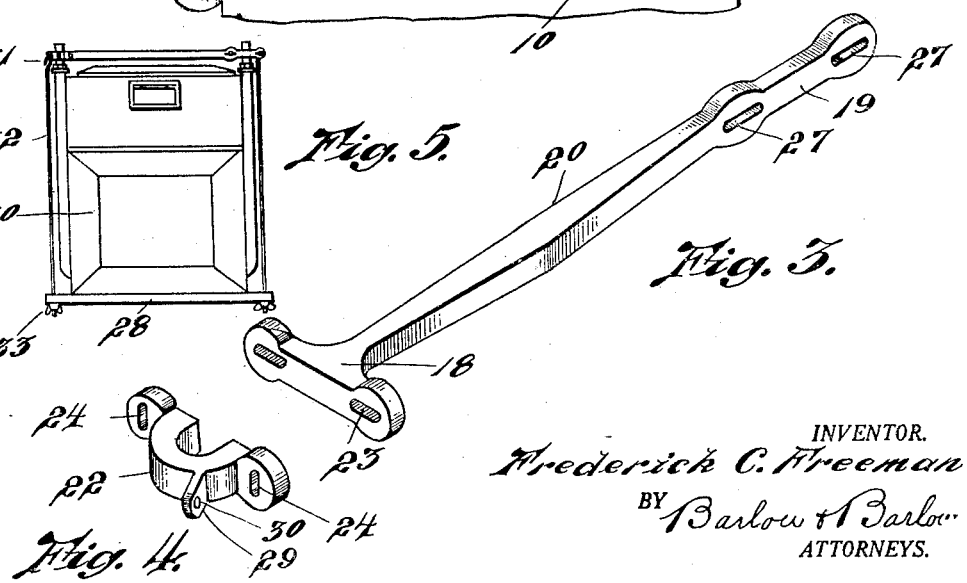
INVENTOR.
Frederick C. Freeman
BY Barlow & Barlow
ATTORNEYS.

Patented Mar. 3, 1931

1,795,019

UNITED STATES PATENT OFFICE

FREDERICK C. FREEMAN, OF PROVIDENCE, RHODE ISLAND

METER-PIPE-SUPPORTING CLAMP

Application filed June 12, 1929. Serial No. 370,416.

This invention relates to an improved construction of clamp device for supporting gas meter connections; and has for its object to provide a clamp device of this character which is simple and inexpensive in construction and effective in its operation and may be readily secured to the inlet and outlet meter pipes regardless of whether or not these pipes be positioned either in or out of alignment with each other.

A further object of the invention is to provide a clamping cross bar having a clamping portion at either end thereof to which may be bolted cooperating clamping members for gripping and binding the inlet and outlet pipes to rigidly connect them together and prevent them from being bent or torn from the meter by excessive strains.

The invention further consists in disposing the end clamping members of this clamping device in different relative planes to permit of more ready adjustment to accommodate meter pipes which are out of alignment with each other.

With these and other objects in view, the invention consists of certain novel features of construction, as will be more fully described, and particularly pointed out in the appended claims.

In the accompanying drawings:

Fig. 1 is a top view of a gas meter, showing my improved clamping device as secured to the meter inlet and outlet pipes.

Fig. 2 illustrates this clamping device for supporting meter connections as applied to a so-called swiveling pipe connection at a point adjacent the meter.

Fig. 3 is a perspective view showing the cross bar with its clamping ends disposed in different relative planes.

Fig. 4 is a perspective view of one of the U-shaped cooperating clamp members.

Fig. 5 is a side elevation showing my improved clamp bar with the base supporting rods attached thereto.

The ordinary gas meter is built of thin sheet metal such as tin and is provided with inlet and outlet tubings vertically disposed along its opposite sides and connected thereto by solder. At the upper ends of these tubes is connected a so-called swivel unit which includes the union and a short length of lead pipe and the outlet end is connected to the piping system thru which the user is supplied.

It is found in practice that no two gas meters of the same size are alike, for the reason that a gage or templet cannot be used in mounting or attaching the gas inlet and outlet tubes to the sides of the tank or body portion of the meter, and therefore the distance between these inlet and outlet tubes is bound to vary and as result the pipes are often set out of alignment with each other. When connection is being made to these misaligned pipes, excessive or rupturing strains are often brought to bear upon the meter connections; then again, when the gas is to be shut off from the main especially when the valve, which is located in the inlet pipe is stuck or frozen considerable force is required to move the valve, which force also has a tendency to strain the pipes and in some cases, where my supporting clamp is not used, the thin tubing becomes broken thus rendering these connections somewhat of a hazard.

To obviate this difficulty and prevent these strains from being transmitted to the meter itself and to firmly support these inlet and outlet pipe connections, I have provided a cross-bar member which is adapted to be rigidly clamped to both the inlet and outlet pipes, preferably to the so-called meter swivel portions or connections at a point adjacent the meter so as to prevent these pipes from becoming ruptured at the point where connected to the meter. Also it is found of advantage to so construct such a clamping device that it may be readily applied to the inlet and outlet meter pipes even though these pipes are out of alignment with each other, which is often the case and that without disconnecting the meter from its set position or disturbing any of its pipe connections; and the following is a detailed description of the present embodiment of my invention and showing one arrangement of parts by which these advantageous results may be accomplished:

With reference to the drawings, 10 designates the usual meter which is ordinarily constructed of thin metal such as tin and the like to the opposite sides of which are secured by solder or otherwise the vertically disposed inlet pipe or tube 11 and the similarly disposed outlet pipe or tube 12. These pipes or tubes are also usually formed of thin metal such as tin and are soldered to the sides of the meter casing.

At the upper end of these tubes is usually connected the threaded member 13 of the pipe union with its shank portion 14 extending for a short distance into the upper end of each of the tubes 11 and 12. Resting upon this member of the unit is a short length of inlet piping 15 and a short length of outlet piping 17 which are connected thru their respective fastening nuts 16 to the member 13 of the union, thereby forming what is known in the trade as a swivel and to these short lengths of pipes I preferably secure the supporting clamp device, presently described.

My improved connector device comprises essentially a cross bar 20 which has a T-shaped clamp head 18 at one end that rests against the inlet pipe 15 and has a clamp end portion 19 to lie against and extend beyond the outlet pipe 17. By this construction the T-head lies in a plane at substantially right angles to the plane of the axis of the bar. To this T-head I secure by means of bolts 21 a clamping yoke member 22.

As best shown in Figs. 3 and 4 the T-head 18 is provided with transverse slots 23 and the clamp yoke with vertically disposed slots 24 so that when the bolts 21 are passed thru these slots this clamp yoke may be adjusted either laterally or on an incline to accommodate the tubes or pipes, which are out of relative vertical alignment. The same is true of the end 19 of the cross bar 20 which is designed to extend beyond and to lie against one side of the swivel pipe 17 and a cooperating clamp yoke 25 is provided to embrace the pipe 17 and be secured to this end of the bar by means of bolts 26.

A duplicate of that clamp yoke illustrated in Fig. 4, which is designed to fit the T-head yoke shown, may be applied to the end 19 of the cross bar, this end 19 being provided with longitudinal slots 27 while the clamp yoke is provided with vertical slots 24, by which construction it will be seen that the clamp on this cross bar may be adapted to engage and bind together inlet and outlet pipes which may be relatively inclined either away from or toward each other, or which may be laterally offset out of alignment with each other and yet these clamp yokes may be securely fastened in position to grip and bind these pipes and support them in whatever position they may be set without the necessity of breaking any of the connecting joints and so securely tie together and support these two pipes against rupture or being torn apart or away from the sides of the meter by unusual or excessive strains being brought to bear upon the same.

In some instances, it is found of advantage to provide a support 28 for the bottom of the meter casing and to do this I have provided an ear 29 on each of these clamping yokes having an eye 30 therein thru which the hook ends 31 of the tie rods 32 pass, the lower ends of these tie rods being threaded and provided with nuts 33 to bind this cross bar 28 in position against the bottom of the casing.

It will be noted that my improved clamping device is a unit complete in itself and may be applied to any meter connection, however out of alignment they may be, to connect together and rigidly support the same against rupture from unusual or excessive strains.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. Means for connecting inlet and outlet meter pipes of a meter tank comprising a T-shaped unitary bar adapted to have the head end clamped to one pipe with the other end of the bar extending beyond the second pipe, said other end having means to adjustably and detachably clamp said other end to said second pipe, whereby said pipes are held against relative movement during adjustment and use of the meter.

2. Means for connecting inlet and outlet meter pipes of a meter tank comprising a unitary bar having a head end at an angle to the remainder of the bar and adapted to have the head end clamped to one pipe with the other end of the bar extending beyond the second pipe and having a straight portion in line with the general extent of the bar to contact therewith, and means to adjustably and detachably clamp said other end to said second pipe, whereby said pipes are held against relative movement during adjustment and use of the meter.

In testimony whereof I affix my signature.

FREDERICK C. FREEMAN.